(12) United States Patent
Cui et al.

(10) Patent No.: US 10,285,428 B2
(45) Date of Patent: May 14, 2019

(54) DEVICE INTEGRATING CRUSHING, PULPING AND ENZYME DEACTIVATION OF FRUITS

(71) Applicant: Jiangnan University, Wuxi (CN)

(72) Inventors: Zhengwei Cui, Wuxi (CN); Jianfeng Yu, Wuxi (CN); Haiying Chen, Wuxi (CN); Liangfeng Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 443 days.

(21) Appl. No.: 15/114,075

(22) PCT Filed: Dec. 11, 2015

(86) PCT No.: PCT/CN2015/097083
§ 371 (c)(1),
(2) Date: Jul. 26, 2016

(87) PCT Pub. No.: WO2017/092070
PCT Pub. Date: Jun. 8, 2017

(65) Prior Publication Data
US 2017/0367398 A1 Dec. 28, 2017

(30) Foreign Application Priority Data
Dec. 1, 2015 (CN) .......................... 2015 1 0862729

(51) Int. Cl.
*A23N 1/02* (2006.01)
*A23L 2/04* (2006.01)

(52) U.S. Cl.
CPC . *A23N 1/02* (2013.01); *A23L 2/04* (2013.01)

(58) Field of Classification Search
CPC .................................... A23L 2/04; A23N 1/02
(Continued)

(56) References Cited

U.S. PATENT DOCUMENTS 3,062,724 A * 11/1962 Reusser ................. C12M 23/34
435/293.1
3,351,000 A * 11/1967 Bruce .................... A23N 1/003
100/110

(Continued)

FOREIGN PATENT DOCUMENTS

CN 88101329 A 10/1988
CN 101502334 A 8/2009
(Continued)

*Primary Examiner* — Dana Ross
*Assistant Examiner* — Kuangyue Chen
(74) *Attorney, Agent, or Firm* — Gokalp Bayramoglu

(57) ABSTRACT

The invention relates to a device integrating crushing, pulping and enzyme deactivation of fruits, comprising a spiral feeder, a crushing cavity and a drive motor. The spiral feeder is disposed above the crushing cavity. The crushing cavity consists of an inner crushing cavity and an outer crushing cavity. The inner crushing cavity is internally provided with crushing blades and a comb-like cylindrical stator. The crushing blades are formed with a plurality of steam outlets. The outer crushing cavity is internally provided with a ring steam pipe. The ring steam pipe is also formed with steam outlets on the lower side. The outer crushing cavity is provided with a discharge hole. The device integrating crushing, pulping and enzyme deactivation of fruits completes enzyme deactivation and pulping at the same time, has a large production capacity and a high efficiency, and can meet requirements of industrial production.

8 Claims, 4 Drawing Sheets

(58) Field of Classification Search
USPC .......... 99/452, 509, 510, 511, 513, 516, 525
See application file for complete search history.

(56) References Cited

U.S. PATENT DOCUMENTS

| | | | | |
|---|---|---|---|---|
| 3,560,120 | A | * | 2/1971 | Gannaway et al. .. F04C 29/021 417/372 |
| 4,768,425 | A | * | 9/1988 | Bonifacino .............. A23G 3/04 127/19 |
| 6,449,872 | B1 | * | 9/2002 | Olkku ....................... C12C 1/02 34/267 |
| 2009/0162508 | A1 | * | 6/2009 | Davies .................... A47J 19/02 426/481 |
| 2010/0242838 | A1 | * | 9/2010 | Fukumori ............... A23P 20/12 118/58 |
| 2012/0213902 | A1 | * | 8/2012 | Leung .................... A47J 27/04 426/510 |
| 2015/0345649 | A1 | * | 12/2015 | Semmes ............ F16K 11/0856 137/625.23 |

FOREIGN PATENT DOCUMENTS

| | | |
|---|---|---|
| CN | 204217815 U | 3/2012 |
| CN | 102475347 A | 5/2012 |
| CN | 104286809 A | 1/2015 |

\* cited by examiner

DEVICE INTEGRATING CRUSHING, PULPING AND ENZYME DEACTIVATION OF FRUITS

TECHNICAL FIELD

The present invention relates to a device integrating enzyme deactivation, crushing and pulping of easy-browning fruits, in particular to the processing of easy-browning juice beverages, a processing technology and a device for squeezing fresh juice.

BACKGROUND

A juice beverage is a juice product obtained using fruits as raw materials by such physical means as squeezing, centrifugation, extraction, etc. Fruit juice is classified into clear juice and cloudy juice by form. Juice beverages are rich of vitamins and micro-elements which are necessary for human bodies, are healthy, delicious and popular among customers. However, some common fruits, such as apples, juicy peaches, pears and bananas, have a very high content of polyphenol oxidase. During processing, when those fruits are crushed, the polyphenol oxidase contacts substrates and triggers an enzyme browning reaction immediately, thus seriously affecting the sensory quality, reducing customers' desire to buy, lowering the commodity value, and even resulting in losses in the nutrient elements and decline in nutritive value. Through studies, it is found that about 85% of the browning reactions occur during crushing in the process of apple processing. How to solve the browning problem is a key for processing high-quality juice. So far, there is no breakthrough and progress made for this issue in our country and even around the whole world.

SUMMARY OF THE INVENTION

The applicant has made research and improvement according to the browning theory of easy-browning fruits and defects of the current fruit pulping, and provides a device integrating crushing, pulping and enzyme deactivation of fruits, which can deactivate enzymes by steam heating at the moment of fruit pulping.

Solution

The technical solution of the present invention is as follows:

A device integrating crushing, pulping and enzyme deactivation of fruits includes a spiral feeder, a crushing cavity and a drive motor. The spiral feeder is disposed above the crushing cavity. The crushing cavity consists of an inner crushing cavity and an outer crushing cavity. The inner crushing cavity is internally provided with crushing blades and a comb-like cylindrical stator; the crushing blades are connected to the upper part of a main shaft which is rotationally disposed in the inner crushing cavity, and is connected with the drive motor. The main shaft and the crushing blades are internally formed with steam channels. The crushing blades are formed with a plurality of steam outlets, which are communicated with the steam channels, in the radial and axial directions. The steam channel at the upper end of the main shaft is connected with a steam inlet pipe. The outer crushing cavity is internally provided with a ring steam pipe. The ring steam pipe also has steam outlets on the lower side. The ring steam pipe is also connected with the steam inlet pipe. The outer crushing cavity is provided with a discharge hole.

Further, the steam channel formed on the upper part of the main shaft is connected with the steam inlet pipe through a rotary sealing joint; the steam inlet pipe is provided with a ball valve and a steam flow meter; and the steam inlet pipe is fixed on the upper side of the crushing cavity through a steam inlet pipe holder.

Further, the lower end of the main shaft is installed and fixed in a bearing block through a bearing, and the lower end of the main shaft is connected with a belt pulley; and the belt pulley is connected with a belt pulley disposed at a driving end of the drive motor through a belt.

Optimally, the bearing block and the drive motor are installed on an engine base.

Further, the spiral feeder includes a feeding drive motor, a reducer, a tube and a feed screw; the feed screw is disposed in the tube and the feed screw connects the reducer and the feeding drive motor; the upper end of the tube is formed with a feed port, while the lower end of the tube is communicated with the inner crushing cavity.

Optimally, the upper end of the tube of the spiral feeder is formed with a liquid inlet pipe.

Further, the feeding pressure of the steam is in a range of 0.15~0.2 MPa.

Further, the rotation scope of the crushing blades is in 1,400~2,000 rpm.

Further, the wait time of materials in the crushing cavity is 10~30 s.

The present invention has the following beneficial effects: the device integrating crushing, pulping and enzyme deactivation of fruits feeds steam at the moment of crushing; the steam heats crushed materials to the required temperature instantaneously and keeps the temperature for a required time, which does not overheat and boil the juice, can deactivate the polyphenol oxidase in the fruits and can well protect the color and nutrients of the squeezed juice. The device which can execute a physical means for enzyme deactivation, eliminates insecurity of food caused by adding sulfite, performs continuous production mode coupling with enzyme deactivation and crushing, has a large production capacity and a high efficiency, and can meet the requirements of industrial production.

Figure 1:
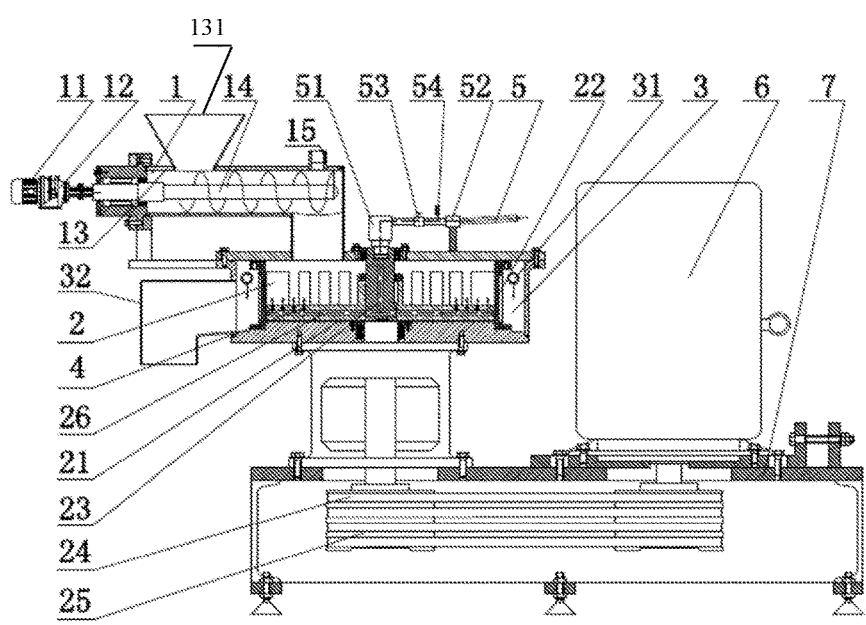
FIG. 1 is a sectional view of a device integrating crushing, pulping and enzyme deactivation of fruits according to the present invention.
Figure 2:
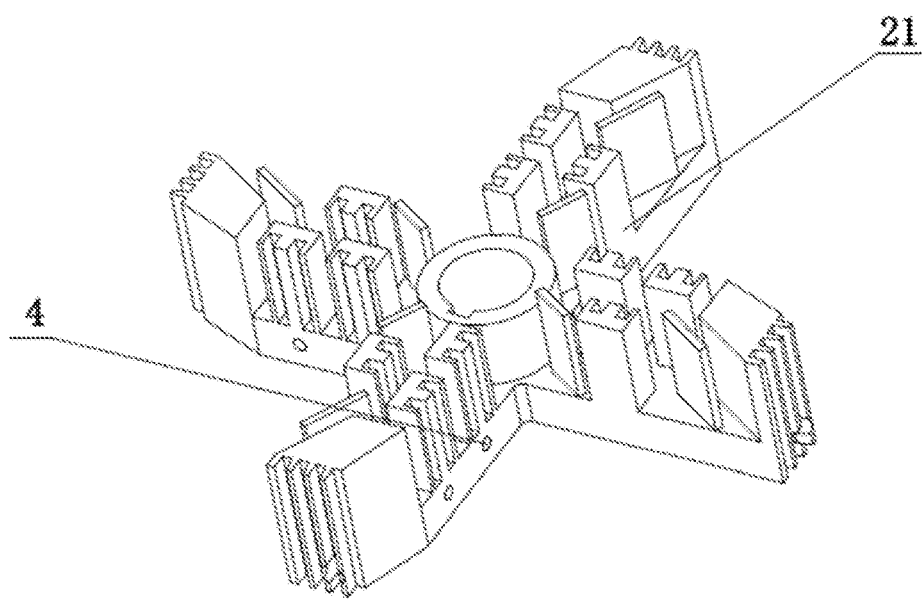
FIG. 2 is a structural view of a crushing blade.
Figure 3:
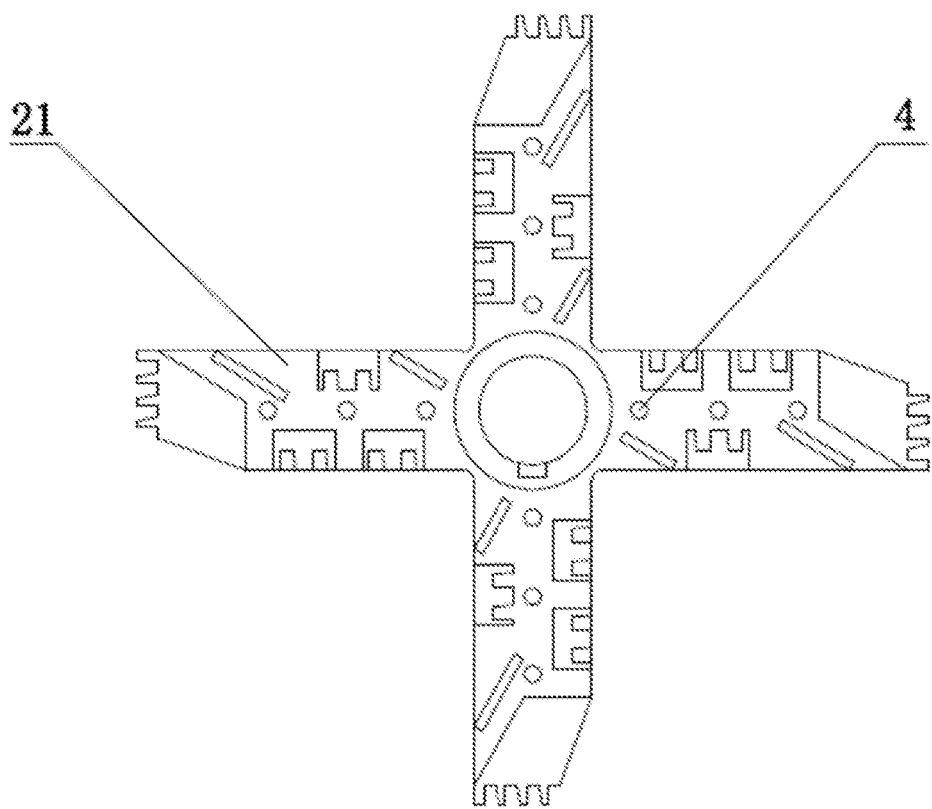
FIG. 3 is a top view of a crushing blade.
Figure 4:
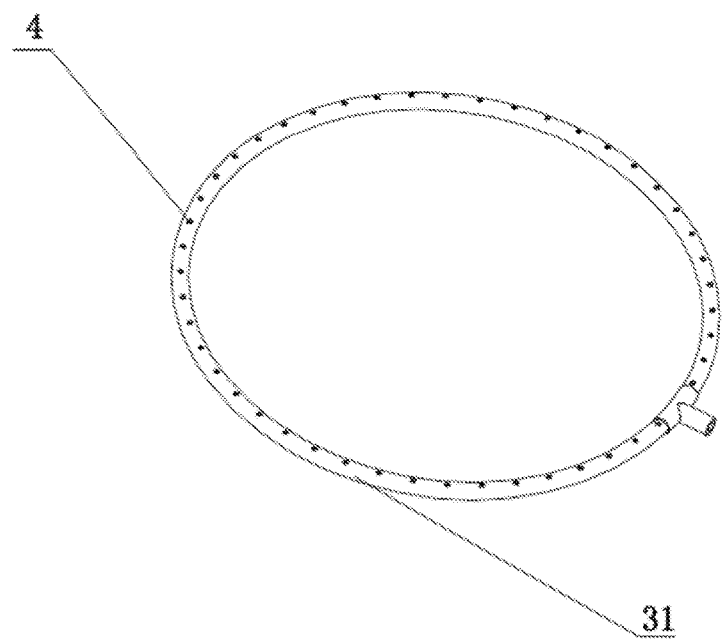
FIG. 4 is a structural view of a ring steam pipe.

In the drawings, marks are as follows: 1. spiral feeder; 11. feeding drive motor; 12. reducer; 13. tube; 131. feeding port; 14. feed screw; 15. purified water inlet; 2. inner crushing cavity; 21. crushing blade; 22. comb-like cylindrical stator; 23. main shaft; 24. belt pulley; 25. belt; 26. steam channel; 3. outer crushing cavity; 31. ring steam pipe; 32. discharge hole; 4. steam outlet; 5. steam inlet pipe; 51. rotary sealing joint; 52. steam inlet pipe holder; 53. ball valve; 54. steam flow meter; 6. drive motor; 7. engine base.

DETAILED DESCRIPTION OF THE EMBODIMENT

The embodiments of the present invention are described below with reference to the attached drawings.

According to the present invention, a device integrating crushing, pulping and enzyme deactivation of fruits includes a spiral feeder 1, a crushing cavity and a drive motor 6. The crushing cavity consists of an inner crushing cavity 2 and an outer crushing cavity 3. The spiral feeder 1 is disposed above the crushing cavity. The spiral feeder 1 includes a feeding drive motor 11, a reducer 12, a tube 13 and a feed screw 14. The feed screw 14 is disposed in the tube 13, and the feed screw 14 connects the reducer 12 and the feeding drive motor 11. The feeding drive motor 11 drives the feed screw 14 via the reducer 12. The rotation speed of the feeding drive motor 11 can be regulated by a frequency converter according to the feeding speed and feeding amount of the materials needed to be regulated. The front section of the upper end of the tube 13 is formed with a feeding port 131, while the rear section is formed with a purified water inlet 15. The lower end of the tube 13 is communicated with the inner crushing cavity 2. The inner crushing cavity 2 is internally provided with crushing blades 21 and a comb-like cylindrical stator 22. The crushing blades 21 are integrally connected with the upper part of the main shaft 23. The upper part of the main shaft 23 is rotationally disposed in the inner crushing cavity 2. The upper part of the main shaft 23 and the crushing blades 21 are internally formed with steam channels 26. The crushing blades 21 are formed with a plurality of steam outlets 4, which are communicated with the steam channels 26, in the radial and axial directions. The steam channel 26 at the upper end of the main shaft 23 is connected with the steam inlet pipe 5 via a rotary sealing joint 51. The steam inlet pipe 5 is fixed on the upper side of the crushing cavity through a steam inlet pipe holder 52, and the steam inlet pipe 5 is provided with a ball valve 53 and a steam flow meter 54, capable of adjusting the inflow of the steam. By the centrifugal force of the crushing blades 21, materials are quickly crushed and enter the space of the outer crushing cavity 3 in a short time, and the material temperature usually fails to reach the required value, so the outer crushing cavity 3 is internally provided with a ring steam pipe 31. The ring steam pipe 31 is also formed with steam outlets 4 on the lower side. The ring steam pipe 31 is also connected with the steam inlet pipe 5, so the steam is downwardly sprayed onto the crushed materials in the outer crushing cavity 3. The outer crushing cavity 3 is provided with a discharge hole 32. The lower part of the main shaft 23 is fixed in a bearing block via a bearing, and the lower end of the lower part of the main shaft is connected with a belt pulley 24. The belt pulley 24 is connected with a belt pulley 24 disposed at a driving end of the drive motor 6 through a belt 25. The drive motor 6 can drive the main shaft 23 and the crushing blades 21 to rotate together, cooperating with the comb-like cylindrical stator 22 to crush materials. The drive motor 6 and the bearing block are fixedly installed on an engine base 7. The crushing cavity is installed on the bearing block.

When the device integrating crushing, pulping and enzyme deactivation of fruits is used, materials to be crushed and pulped are fed via the feeding port 131 and then pushed into the inner crushing cavity 2 by the feed screw 14, and if needed, a certain amount of purified water is added via the purified water inlet 15. By the high-speed impact effect of the crushing blades 21 and the cutting effect of blade edges, materials are quickly crushed and refined, while steam is fed via the steam inlet pipe 5. The steam enters the steam channels 26 via the rotary sealing joint 51, and finally is sprayed out via the steam outlets 4 formed on the crushing blades 21 in the radial and axial directions to directly contact and heat the materials in the inner crushing cavity 2. Another path of steam enters the ring steam pipe 31 and is sprayed onto the crushed pulp in the outer crushing cavity 3 via the steam outlets 4 which are uniformly distributed on the lower side of the ring steam pipe 31 to perform further heating. By rationally regulating the steam pressure and flow and the feeding amount of the materials, the material temperature can be kept for the time required for enzyme deactivation. Juice obtained after crushing and enzyme deactivation is discharged via the discharge hole 32, is cooled by a heat exchanger or vacuum cooled to room temperature, thus preventing damage to the thermo-sensitive elements in the juice and avoiding boiled smell because of overlong material heating.

Embodiment 1: Preparation of Cloudy Apple Juice

Fuji apples (origin in Shaanxi province, China) were washed and halved. Two parts were weighed, 10 kg each. One part had vitamin C powder added in a ratio of 0.006% (w/w). The mixture was fed via the spiral feeder 1 at a feeding speed of 10 Kg/min. The cavity for enzyme-deactivation, pulping and crushing has a diameter of 280 mm and a rotation speed of 1,400 rpm. Steam was fed at a pressure of 0.15 MPa, a temperature of 110° C. and a flow rate of 8.50 L/s. The final average temperature of the apple pulp at the outlet was 90° C.±4° C. The pulping and enzyme deactivation integrated device was used to prepare cloudy apple juice which was bright in color and had an aromatic flavor. 5 mg of apple juicy was added into a colorimetric disk (with the temperature controlled to be 25° C.), and an automatic color difference meter (model: TC-PIIG, Beijing Optical Instrument Factory) was used to determine the juice color values and the change value L of the juice color along with the time. The color of the apple pulp which did not undergo enzyme deactivation by adding steam was determined. Comparison was made. The larger the L value is, the brighter the juice is; the smaller the L* value is, the darker the juice is. Results can be seen in table 1. The anti-browning effect of sodium metabisulfite is good, so apple juice with 1% sodium metabisulfite added was used as a standard sample.

TABLE 1

Color values of the apple juice prepared by different processing methods

| | Crushing and pulping with sodium metabisulfite | Crushing and pulping without steam | Crushing and pulping with steam | Crushing and Pulping with steaming, and adding 0.06% vitamin C |
|---|---|---|---|---|
| L (at the moment of being crushing) | 28.52 | 18.55 | 28.43 | 28.50 |
| L (after being kept still for 60 min) | 25.52 | 16.75 | 28.35 | 23.46 |
| Browning rate (during crushing) | 0 | 84.49% | 0.76% | 0.17% |
| Browning rate (during keeping) | 0 | 15.51% | 0.68% | 0.34% |

$$\text{Relative browning rate} = : \frac{L_{control} - L_{sample\ t}}{L_{control} - L_{blank\ t}} \times 100\%$$

$L^*_{control}$
Value L of apple juice after being crushed, pulped and crushed with 1% sodium metabisulfite;

$L^*_{blank\ t}$

Value L of the apple juice after being crushed, pulped and kept for time t;

$L^*_{sample\ t}$

Value L* of the apple juice after being pulped with steam for preventing browning and kept for time t.

Embodiment 2: Preparation of Juicy Peach Juice

Fresh juicy peaches were washed and de-cored. 10 kg of juicy peaches were fed by using the spiral feeder 1 at a feeding speed of 10 kg/min. The cavity for enzyme-deactivation, pulping and crushing has a diameter of 280 mm and a rotation speed of 1,400 rpm. Steam was fed at a pressure of 0.15 MPa, a temperature of 110° C. and a flow rate of 8.35 L/s. The final average temperature of the peach pulp at the outlet was 88° C.+4° C. The pulping and enzyme deactivation integrated device was used to prepare juicy peach juice which was bright in color and had an aromatic flavor. The color difference meter was used to determine value L*, which represents the brightness value of the juice, along with time, and the color of the juice was compared with the color of the peach juice which did not undergo steaming and enzyme deactivation. Results can be seen in table 2.

TABLE 2

Color values of the peach juice prepared by different processing methods

|  | Crushing and pulping with sodium metabisulfite | Crushing and pulping without steam | Crushing and pulping with steam | Crushing and Pulping with steaming, and adding 0.05% vitamin C |
| --- | --- | --- | --- | --- |
| L (at the moment of being crushing) | 22.12 | 12.55 | 21.43 | 21.51 |
| L (after being kept still for 60 min) | 22.12 | 10.75 | 21.15 | 21.26 |
| Browning rate (during crushing) | 0 | 84.17% | 6.07% | 5.36% |
| Browning rate (during keeping) | 0 | 15.83% | 2.50% | 2.20% |

Embodiment 3: Preparation of Banana Powder

10 Kg of peeled banana was weighed and fed by using the spiral feeder at a feeding speed of 5 Kg/min, while purified water was added into the inner cavity at a ratio of 1:0.5 during feeding with the screw. The cavity for enzyme-deactivation, pulping and crushing has a diameter of 280 mm and a rotation speed of 1,500 rpm. Steam was fed at a pressure of 0.2 MPa, a temperature of 121° C. and a flow rate of 7.10 L/s. The average temperature of the banana pulp at the outlet was 89.6° C.+4° C. The pulping and enzyme deactivation integrated device was used to prepare banana pulp which was bright in color and had an aromatic flavor. The banana pulp was atomized and dried to obtain high-quality banana powder. The color difference meter was used to determine the change of banana pulp color along with time, and the color of the banana pulp was compared with the color of the banana pulp which did not undergo steaming and enzyme deactivation. Results can be seen in table 3.

TABLE 3

Color values of the banana pulp prepared by different processing methods

|  | Crushing and pulping with sodium metabisulfite | Crushing and pulping without steam | Crushing and pulping with steam | Crushing and Pulping with steaming, and adding 0.04% vitamin C |
| --- | --- | --- | --- | --- |
| L (at the moment of being crushing) | 32.68 | 15.55 | 31.33 | 31.61 |
| L (after being kept still for 60 min) | 32.68 | 11.48 | 30.35 | 30.87 |
| Browning rate (during crushing) | 0 | 80.80% | 6.37% | 4.88% |
| Browning rate (during keeping) | 0 | 15.83% | 4.62% | 3.66% |

What is claimed is:

1. A device integrating crushing, pulping and enzyme deactivation of fruits, comprising a spiral feeder, a crushing cavity and a drive motor, the spiral feeder being disposed above the crushing cavity, the crushing cavity comprising an inner crushing cavity and an outer crushing cavity; wherein the inner crushing cavity is internally provided with crushing blades- and a comb-like cylindrical stator; the crushing blades are connected to the upper part of a main shaft; the upper part of the main shaft are rotationally disposed in the inner crushing cavity and are connected with the drive motor; the main shaft and the crushing blades are internally formed with steam channels; the crushing blades is formed with a plurality of steam outlets, which are communicated with the steam channels, in the radial and axial directions; the steam channel at the upper end of the main shaft is connected with a steam inlet pipe; the outer crushing cavity is internally provided with a ring steam pipe; the ring steam pipe is also formed with steam outlets on the lower side; the ring steam pipe is also connected with the steam inlet pipe; and the outer crushing cavity is provided with a discharge hole, the steam channel formed at the upper part of the main shaft is connected with the steam inlet pipe via a rotary sealing joint; the steam inlet pipe is provided with a ball valve and a steam flow meter; and the steam inlet pipe is fixed on the upper side of the crushing cavity via a steam inlet pipe holder.

2. The device integrating crushing, pulping and enzyme deactivation of fruits according to claim 1, wherein, the lower end of the main shaft is connected with a belt pulley; and the belt pulley is connected with another belt pulley disposed at a driving end of the drive motor via a belt.

3. The device integrating crushing, pulping and enzyme deactivation of fruits according to claim 2, wherein, the bearing block and the drive motor are installed on an engine base.

4. The device integrating crushing, pulping and enzyme deactivation of fruits according to claim 1, wherein, the spiral feeder consists of a feeding drive motor, a reducer, a tube and a feed screw; the feed screw is disposed in the tube, while the feed screw connects the reducer and the feeding drive motor; the upper end of the tube is formed with a feeding port, and the lower end of the tube is communicated with the inner crushing cavity.

5. The device integrating crushing, pulping and enzyme deactivation of fruits according to claim 4, wherein the upper end of the tube of the spiral feeder is formed with a liquid inlet pipe.

6. The device integrating crushing, pulping and enzyme deactivation of fruits according to claim 1, wherein the feeding pressure of the steam is in a range of 0.15 MPa~0.2 MPa.

7. The device integrating crushing, pulping and enzyme deactivation of fruits according to claim 1, wherein the rotation speed of the crushing blades is 1,400 rpm-2,000 rpm.

8. The device integrating crushing, pulping and enzyme deactivation of fruits according to claim 1, wherein the wait time of materials in the crushing cavity is 10 seconds-30 seconds.

\* \* \* \* \*